(12) United States Patent  
Ridgway et al.

(10) Patent No.: US 7,587,959 B2  
(45) Date of Patent: Sep. 15, 2009

(54) STEERING COLUMN ASSEMBLY

(75) Inventors: Jason R. Ridgway, Bay City, MI (US); Philip L. Wasalaski, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 258 days.

(21) Appl. No.: 11/704,647

(22) Filed: Feb. 9, 2007

(65) Prior Publication Data

US 2008/0191456 A1     Aug. 14, 2008

(51) Int. Cl.  
*B62D 1/18* (2006.01)

(52) U.S. Cl. .......................... 74/493; 280/775

(58) Field of Classification Search ................... 74/492, 74/493, 89.18, 89.19; 280/775  
See application file for complete search history.

(56) References Cited

U.S. PATENT DOCUMENTS

| | | | |
|---|---|---|---|
| 3,285,090 A | 11/1966 | Cranbury | |
| 3,396,600 A | 8/1968 | Zeigler et al. | |
| 4,709,592 A | 12/1987 | Andersson | |
| 4,752,085 A | 6/1988 | Yamamoto | |
| 4,753,121 A | 6/1988 | Venable et al. | |
| 4,793,204 A | 12/1988 | Kubasiak | |
| 5,979,265 A | 11/1999 | Kim et al. | |
| 6,234,040 B1 | 5/2001 | Weber et al. | |
| 6,237,438 B1 * | 5/2001 | Ben Rhouma et al. | ........ 74/492 |
| 6,237,439 B1 | 5/2001 | Weber et al. | |
| 6,276,719 B1 | 8/2001 | Gartner | |
| 6,460,427 B1 | 10/2002 | Hedderly | |
| 6,623,036 B2 | 9/2003 | Yamamura et al. | |
| 7,350,814 B2 * | 4/2008 | Hong et al. | ................. 280/775 |
| 2002/0020244 A1 * | 2/2002 | Janeczko et al. | .............. 74/493 |
| 2005/0199087 A1 | 9/2005 | Li et al. | |
| 2005/0275206 A1 | 12/2005 | Gerlind | |
| 2008/0141815 A1 * | 6/2008 | Ridgway et al. | .............. 74/493 |

* cited by examiner

*Primary Examiner*—Richard W L Ridley  
*Assistant Examiner*—Terence Boes  
(74) *Attorney, Agent, or Firm*—Thomas N. Twomey

(57) ABSTRACT

A steering column assembly for a vehicle includes a longitudinal lock mechanism having a locked position for preventing longitudinal movement and an unlocked position for permitting longitudinal movement, and a tilt lock mechanism having an engaged position for preventing tilting movement and a disengaged position for permitting tilting movement. A lock select mechanism is coupled to the tilt lock mechanism and the longitudinal lock mechanism to engage the tilt lock mechanism and simultaneously unlock the longitudinal lock mechanism. Similarly, the lock select mechanism disengages the tilt lock mechanism and simultaneously locks the longitudinal lock mechanism. The steering column assembly further includes a drive mechanism operatively connected to the lock select mechanism.

21 Claims, 6 Drawing Sheets

STEERING COLUMN ASSEMBLY

BACKGROUND OF THE INVENTION

1. Field of the Invention

The present invention generally relates to a steering column assembly for a vehicle.

2. Description of the Related Art

Vehicles can be equipped with a steering column that adjusts the position of a steering wheel to enhance the comfort and safety of an operator of the vehicle. For example, the steering column can provide longitudinal movement for moving the steering wheel closer to and away from the vehicle operator. Also, the steering wheel can provide tilting movement to tilt the steering wheel relative to other components of the steering column. These features cooperate to enable the vehicle operator to manually adjust the steering wheel to a desired, convenient position for operating the vehicle and for enabling the steering wheel to be moved out of the way to provide greater access to getting into and out of the vehicle operator's seat.

One such steering column assembly is shown in U.S. Pat. No. 7,293,481 (Li et al.). Li et al. discloses a steering column assembly for a vehicle that includes an outer jacket attached to the vehicle and an inner jacket coupled to the outer jacket. The outer jacket is movable relative to the inner jacket along a longitudinal axis. The steering column assembly of Li et al. further includes a longitudinal lock mechanism for preventing longitudinal movement when the longitudinal lock mechanism is in a locked position and for permitting longitudinal movement when the longitudinal lock mechanism is in an unlocked position. Furthermore, the steering column assembly of Li et al. includes a tilt housing engaged with the inner jacket for providing tilting movement between different angular positions relative to the inner jacket. A tilt lock mechanism is operatively connected to the tilt housing, and has an engaged position for preventing tilting movement and a disengaged position for permitting tilting movement. Additionally, Li et al. discloses a lock select mechanism coupled to the tilt lock mechanism and the longitudinal lock mechanism, through which the longitudinal lock mechanism and the tilt lock mechanism are alternatively engaged. Adjusting movement of the column tilt and longitudinal position is done through a single drive mechanism including a power rotating screw and which is selectively locked with one or the other of the tilt and longitudinal lock mechanisms to make the respective adjusting movement and to lock the column assembly into its adjusted position. The tilt and longitudinal lock mechanisms of the steering column assembly of Li et al. function by locking one or the other of the tilt and longitudinal lock mechanisms to the powered adjusting movement drive mechanism to lock the column in place, and to make the adjusting movement.

Although the steering column assembly disclosed by Li et al. provides ergonomic benefits of being easily adjusted, and to easily select between the alternative modes of tilt and longitudinal adjustment, both with low effort, the attendant cost and packaging constraints may in some cases prohibit use of such a steering column assembly. Thus, although the steering column assemblies of the prior art may be enjoyed by a wide variety of consumers, there remains an opportunity to improve upon the steering column assemblies of the prior art by providing a steering column that allows a vehicle operator to ergonomically adjust both tilting movement and longitudinal movement directly, without requiring a powered adjusting movement drive mechanism and its attendant cost and package space requirements, and which also allows easily selecting alternative modes of column tilt and longitudinal adjustment with low effort.

SUMMARY OF THE INVENTION AND ADVANTAGES

The subject invention provides a steering column assembly for a vehicle. The steering column assembly includes an outer jacket for attachment to the vehicle, an inner jacket coupled to the outer jacket and movable relative to the outer jacket along a longitudinal axis, and a longitudinal lock mechanism operatively connected to the inner jacket and having a locked position for preventing longitudinal movement and an unlocked position for permitting longitudinal movement. A tilt housing provides tilting movement to an angular position, a tilt lock mechanism operatively connects to the tilt housing and has an engaged position for preventing tilting movement and a disengaged position for permitting tilting movement, and a lock select mechanism is coupled to the tilt lock mechanism and the longitudinal lock mechanism. The steering column assembly further includes a drive mechanism operatively connected to the lock select mechanism with the drive mechanism including a motor for moving the longitudinal locking mechanism and the tilt lock mechanism between the respective positions.

The drive mechanism allows a vehicle operator to ergonomically adjust both the tilting movement and the longitudinal movement of the steering column assembly. Furthermore, this provides a power operated lock select mechanism that moves the tilt lock mechanism and the longitudinal lock mechanism between their respective positions. A steering column assembly including the lock select mechanism herein described does not require a powered adjusting movement drive mechanism to which the tilt and longitudinal lock mechanisms are engaged, thereby avoiding attendant cost and package issues associated with column assemblies having powered adjusting movement, while still having easy and low effort selection of alternative modes in which the column may be moved in tilt and longitudinal directions.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
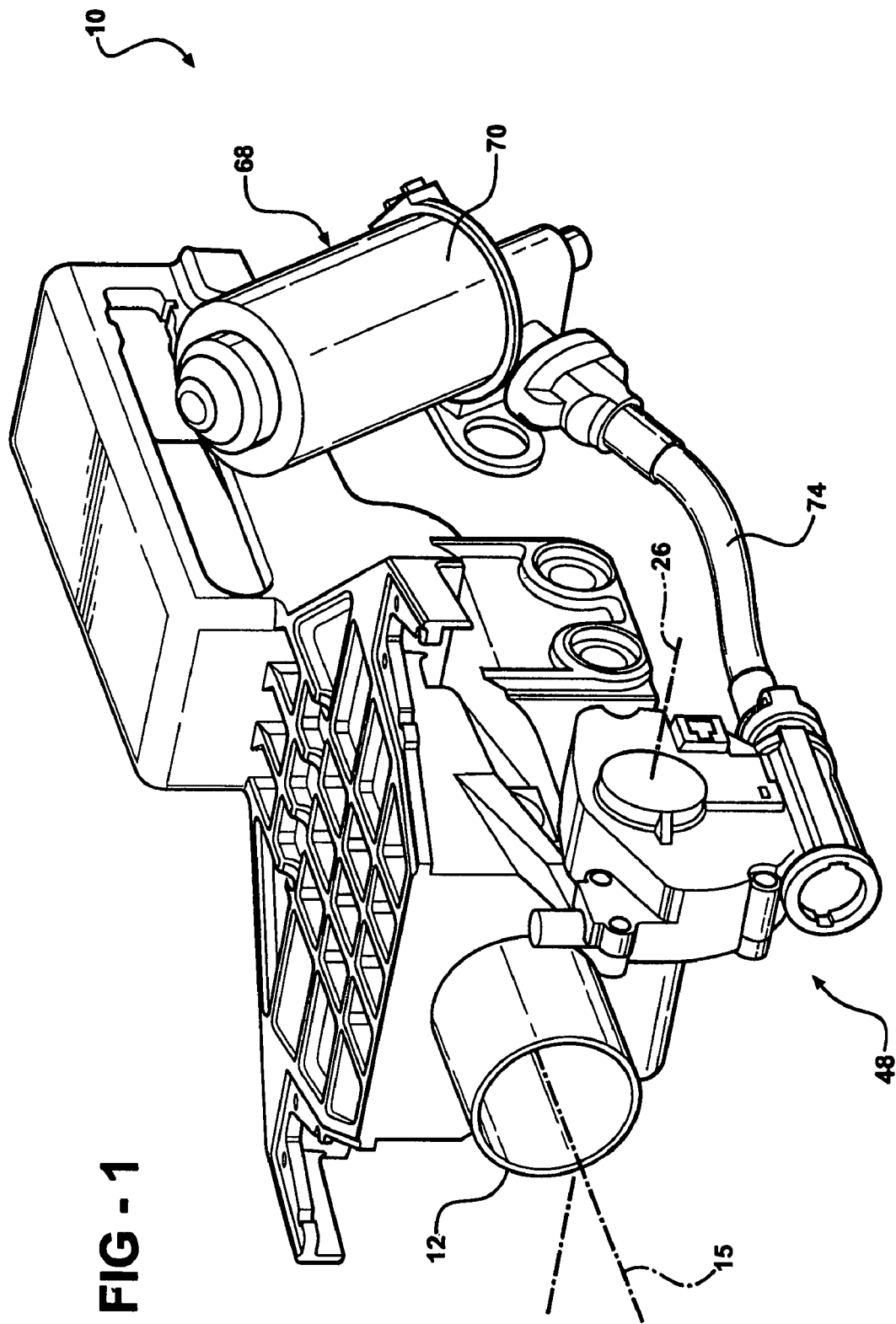
FIG. 1 is a perspective view of a steering column assembly having a drive mechanism.

Referring to the Figures, wherein like numerals indicate corresponding parts throughout the several views, a steering column assembly is shown generally at reference numeral 10. The steering column assembly 10 is generally used in a vehicle (not shown) for adjusting a position of a steering wheel (not shown) in the vehicle. Typically, the steering wheel is adjustable to enhance the comfort and safety of a vehicle operator (not shown). As shown in FIG. 1, the steering column assembly 10 includes an outer jacket 12 for attaching the steering wheel (not shown) to the vehicle. When viewed in cross-section, the outer jacket 12 defines a generally circular shape. Alternatively, the outer jacket 12 may define a generally rectangular shape. Those skilled in the art realize that the outer jacket 12 may define any other shape known in the art.

When fully assembled, the steering column assembly 10 includes an inner jacket 14 coupled to the outer jacket 12 and movable relative to the outer jacket 12 along a longitudinal axis 15. Preferably, the inner jacket 14 is slidably disposed within the outer jacket 12 along the longitudinal axis 15 to provide longitudinal movement. Those skilled in the art realize that longitudinal movement may also include telescoping movement. As with the outer jacket 12, the inner jacket 14 typically defines a generally tubular shape, such as a cylindrical shape. Alternatively, the inner jacket 14 may define a generally rectangular shape. Those skilled in the art realize that the inner jacket 14 may define any other shape known in the art. Also, in order to provide longitudinal movement, those skilled in the art realize that the cross-sectional shape of the inner jacket 14 is the same as the cross-sectional shape of the outer jacket 12. However, those skilled in the art realize that the outer jacket 12 and the inner jacket 14 may define shapes different from one another when viewed in cross-section.

Figure 2:
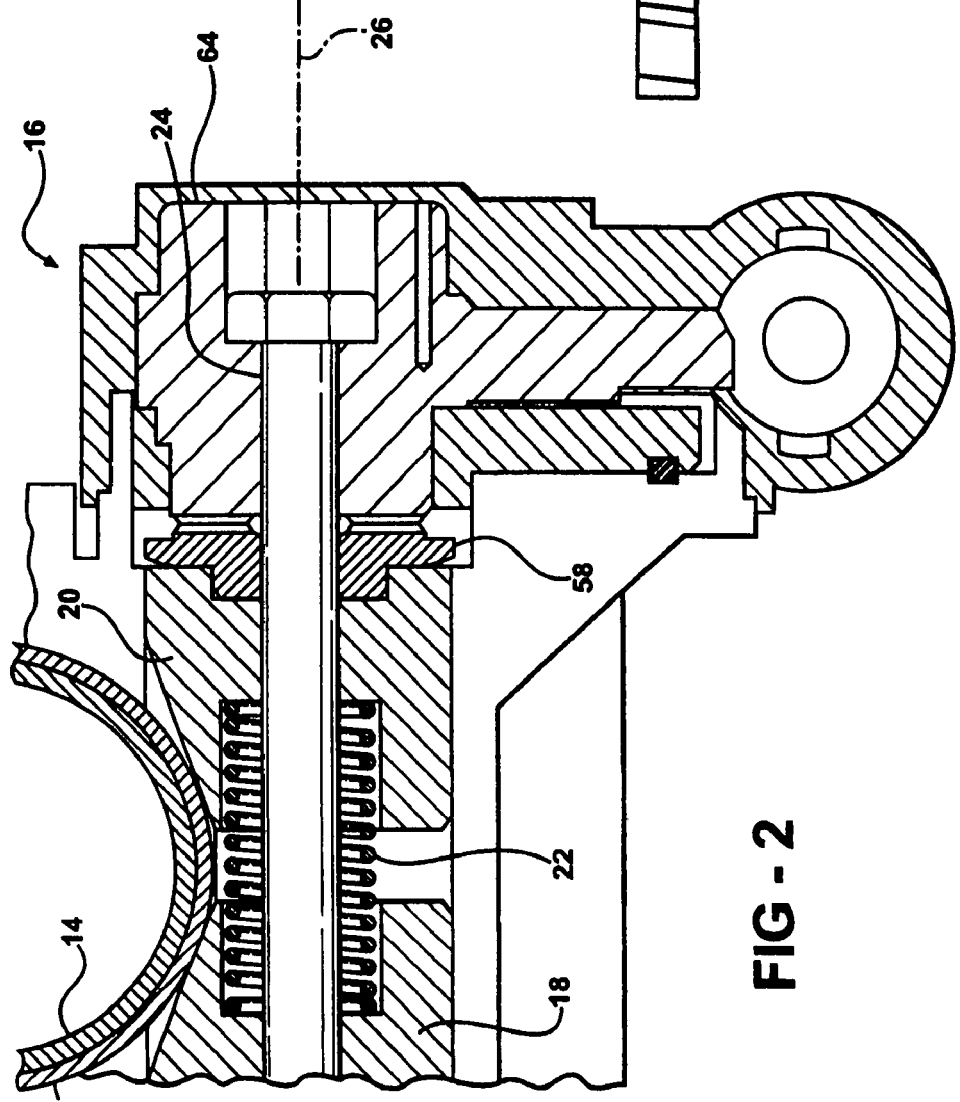
FIG. 2 is a partial cross-sectional side view of a longitudinal lock mechanism used with the steering column assembly of FIG. 1.

Referring now to FIG. 2, a longitudinal lock mechanism 16 is operatively connected to the inner jacket 14 and has a locked position for preventing longitudinal movement and an unlocked position for permitting longitudinal movement. Specifically, the longitudinal lock mechanism 16 is coupled to the inner jacket 14 and when in the locked position, the longitudinal lock mechanism 16 prevents the longitudinal movement of the inner jacket 14 relative to the outer jacket 12 along the longitudinal axis 15. When in the unlocked position, the longitudinal lock mechanism 16 permits the longitudinal movement of the inner jacket 14 relative to the outer jacket 12 along the longitudinal axis 15.

Preferably, the longitudinal lock mechanism 16 includes a first wedge 18 and a second wedge 20. The first wedge 18 is fixed to a wall of the steering column assembly 10, and the second wedge 20 is biased away from the first wedge 18 with an interconnecting spring 22. Both the first wedge 18 and the second wedge 20 have sloped portions abutting the outer jacket 12. When in the locked position, the sloped portions of the first wedge 18 and the second wedge 20 abut the outer jacket 12. A bolt 24 extends through the first wedge 18 and the second wedge 20 for guiding the first wedge 18 and the second wedge 20 along a rotation axis 26 transverse to the longitudinal axis 15. Preferably, the rotation axis 26 is perpendicular to the longitudinal axis 15 and extends through the first wedge 18, the second wedge 20, and the interconnecting spring 22. Those skilled in the art realize that the rotation axis 26 may be transverse to the longitudinal axis 15 at any angle. The interconnecting spring 22 is disposed about the bolt 24 along the rotation axis 26.

When the longitudinal lock mechanism 16 is in the locked position, the interconnecting spring 22 is compressed. When the interconnecting spring 22 is compressed, the second wedge 20 and the first wedge 18 are pushed together against the outer jacket 12. This generates a force between the first and second wedges 18, 20 and the outer jacket 12, and thus a frictional force between the outer jacket 12 and the inner jacket 14. The frictional force prevents the longitudinal movement of the inner jacket 14 relative to the outer jacket 12 along the longitudinal axis 15. When the longitudinal lock mechanism 16 is in the unlocked position, the interconnecting spring 22 is expanded to bias the second wedge 20 away from the first wedge 18, which reduces the frictional force and permits longitudinal movement along the longitudinal axis 15. It is to be appreciated that other longitudinal lock mechanisms may be used with the steering column assembly 10 within the scope of the invention.

Figure 3:
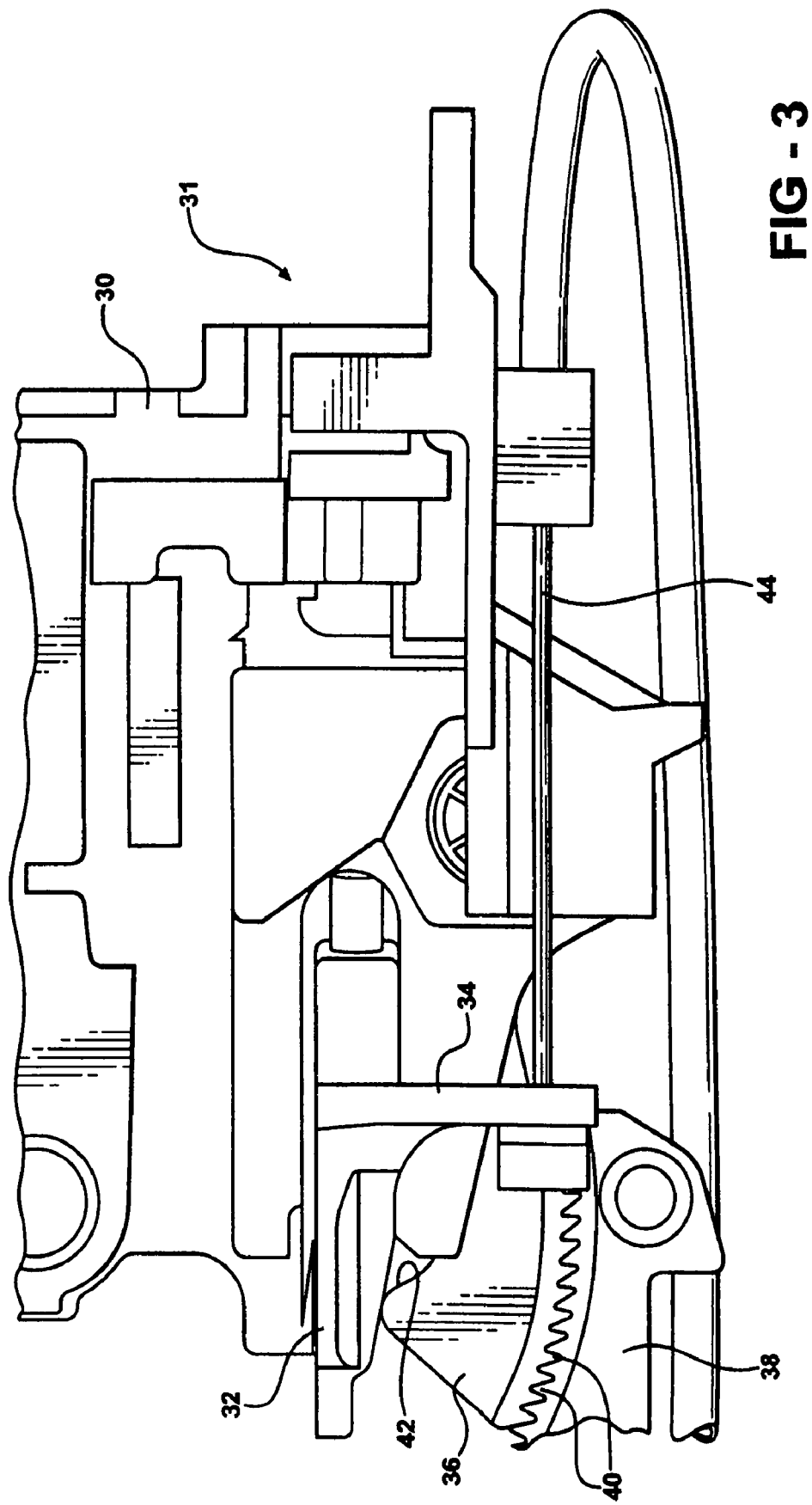
FIG. 3 is a side view of a tilt lock mechanism used with the steering column assembly of FIG. 1 in an engaged position.
Figure 4:
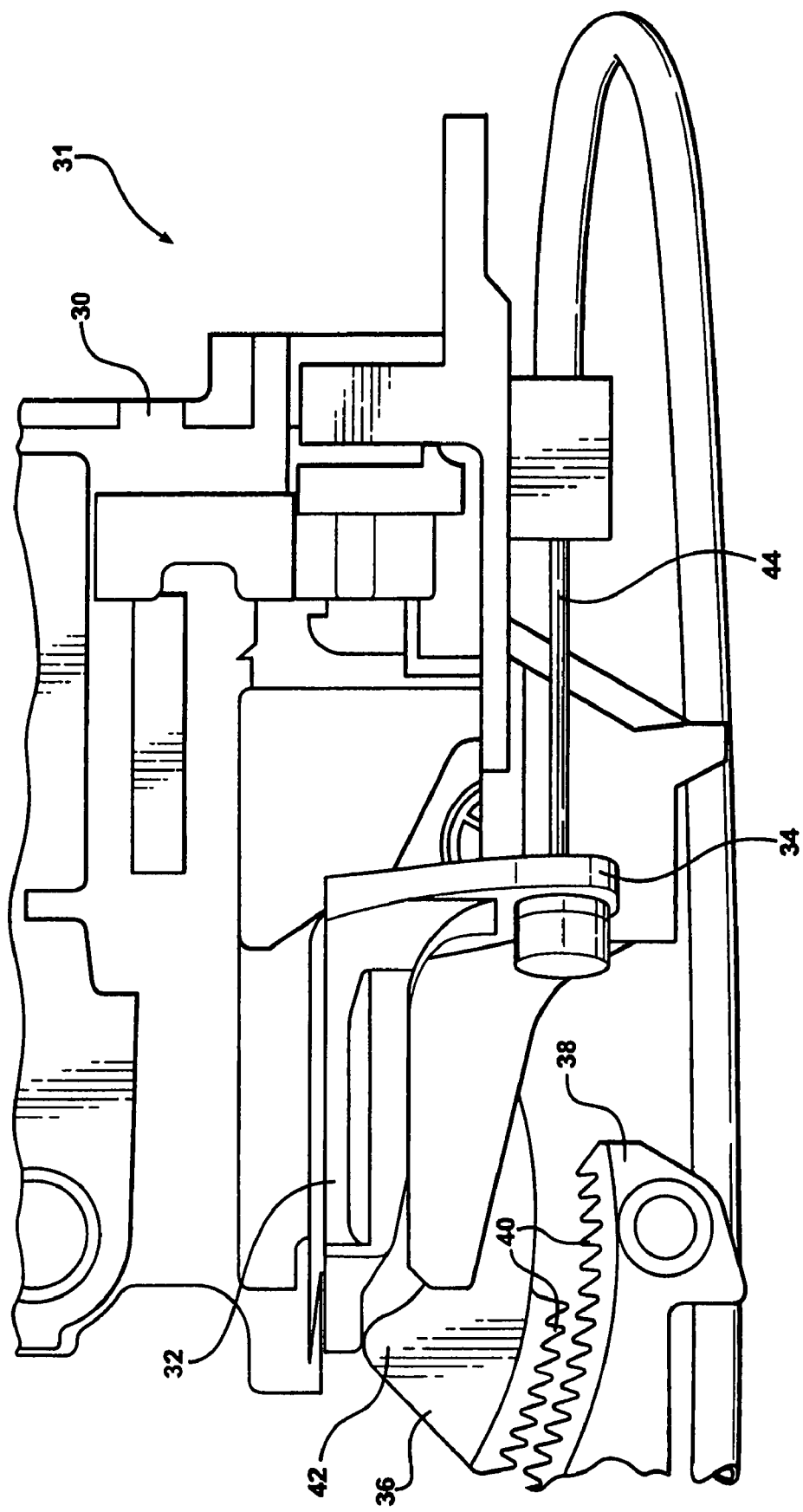
FIG. 4 is a side view of the tilt lock mechanism used with the steering column assembly of FIG. 1 in a disengaged position.

Referring now to FIGS. 3 and 4, a tilt housing 30 provides tilting movement to an angular position. The tilt housing 30 defines a tilt axis (not shown) perpendicular to the longitudinal axis 15, and the tilt housing 30 rotates to a desired angular position about the tilt axis. A tilt lock mechanism 31 is operatively connected to the tilt housing 30 and has an engaged position for preventing tilting movement and a disengaged position for permitting tilting movement. Specifically, when the tilt lock mechanism 31 is in the engaged position, the tilt housing 30 is prevented from rotating to a different angular position about the tilt axis. When the tilt lock mechanism 31 is in the disengaged position, the tilt housing 30 is permitted to rotate to a different angular position about the tilt axis.

The tilt lock mechanism 31 includes a body portion 32 having an arm 34 extending away from the body portion 32. The body portion 32 presents an angled surface such that the body portion 32 tapers away from the arm 34. As shown in FIGS. 3 and 4, the angled surface extends along part of the body portion 32. Those skilled in the art realize that the angled surface may alternatively extend along the entire body portion 32. A first shoe 36 and a second shoe 38 are disposed on the steering column assembly 10 and provided with a pair of cooperating sets of teeth 40 for preventing the tilting movement when the teeth of the first shoe 36 are engaged with the teeth of the second shoe 38. When engaged, the first shoe 36 and the second shoe 38 prevent the tilting movement. The first shoe 36 includes a raised portion 42 for abutting the angled surface of the body portion 32 such that when the body portion 32 moves laterally, the raised portion 42 of the first shoe 36 moves along the angled surface. As a distance between the angled surface and the second shoe 38 changes, the raised portion 42 pivots the first shoe 36 to either engage or disengage the teeth of the first shoe 36 with the teeth of the second shoe 38. Specifically, as the distance between the angled surface and the second shoe 38 gets smaller, the angled surface pushes the raised portion 42 of the first shoe 36 toward the second shoe 38. Once pushed close enough, the teeth of the first shoe 36 engage the teeth of the second shoe 38. Similarly, as the distance between the angled surface and the second shoe 38 gets larger, the angled surface allows the raised portion 42 to separate from the second shoe 38. Once the distance is great enough, the teeth of the first shoe 36 disengage the teeth of the second shoe 38. A shoe spring (not shown) may be used to bias the first shoe 36 away from the second shoe 38.

In order to move the body portion 32 laterally, the tilt lock mechanism 31 includes a cable 44 having one end attached to the arm 34. The other end of the cable 44 is attached to a tilt plate 46 (see FIGS. 5 and 6A). As the tilt plate 46 rotates, it pulls the cable 44. When in the engaged position, the cable 44 is relaxed. In this position, the angled surface of the body portion 32 biases the first shoe 36 toward the second shoe 38 such that the teeth of the first shoe 36 engage the teeth of the second shoe 38. This prevents the tilting movement of the tilt housing 30 to a different angular position about the tilt axis. When in the disengaged position, the cable 44 is taut. In this position, the cable 44 pulls the body portion 32 along the longitudinal axis 15. As the body portion 32 is moved to the disengaged position, the raised portion 42 rides along the angled surface and the distance between the angled surface and the second shoe 38 increases, causing the teeth of the first shoe 36 to disengage the teeth of the second shoe 38. This permits the tilting movement of the tilt housing 30 to a different angular position about the tilt axis. It is to be appreciated that other tilt lock mechanisms may be used with the steering column assembly 10 within the scope of the invention.

Figure 5:
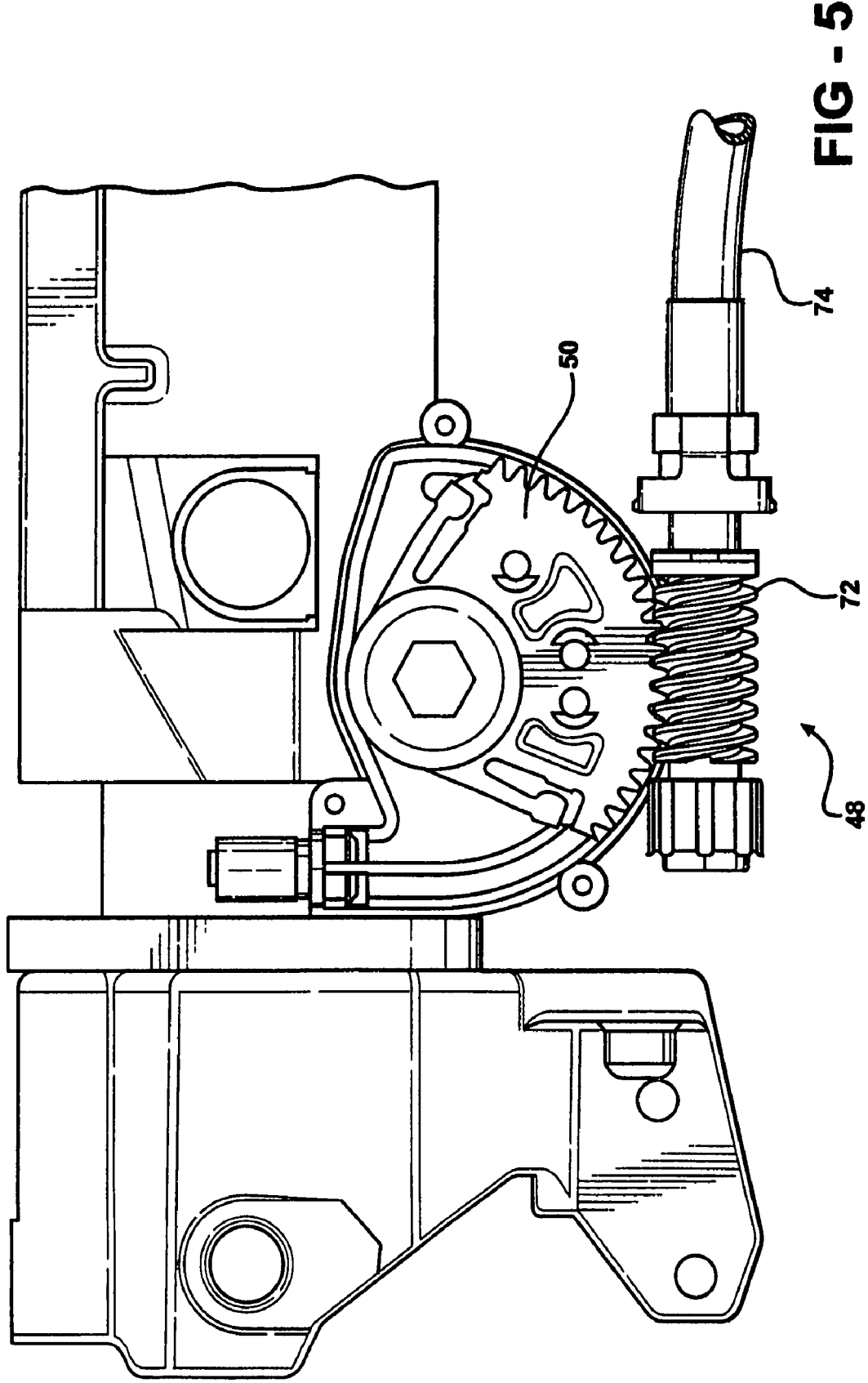
FIG. 5 is a side view of a lock select mechanism and a drive mechanism used with the steering column assembly of FIG. 1.

Referring now to FIG. 5, a lock select mechanism 48 is coupled to the tilt lock mechanism 31 and the longitudinal lock mechanism 16. The lock select mechanism 48 switches the longitudinal lock mechanism 16 between the locked position in which it causes the second wedge 20 to compress the interconnecting spring 22 and create the frictional force against the inner jacket 14, and the unlocked position in which it allows the interconnecting spring 22 to expand, which separates the first wedge 18 and the second wedge 20 and allows the inner jacket 14 to move along the longitudinal axis 15 relative to the outer jacket 12. Similarly, the lock select mechanism 48 switches the tilt lock mechanism 31 between its disengaged position in which it causes the tilt plate 46 to pull the cable 44, which in turn pulls the body portion 32 to disengage the teeth of the first shoe 36 from the teeth of the second shoe 38, and its engaged position in which the lock select mechanism 48 causes the cable 44 to relax and permit the teeth of the first shoe 36 to engage with the teeth of the second shoe 38 to prevent tilting movement of the tilt head 30 to a different angular position about the tilt axis.

The lock select mechanism 48 is configured to control the longitudinal lock mechanism 16 and the tilt lock mechanism 31 simultaneously. It is preferred that the longitudinal lock mechanism 16 is in the locked position and that the tilt lock mechanism 31 is in the engaged position when the longitudinal movement and the tilting movement are not desired (i.e., during normal operation). This way, the longitudinal movement along the longitudinal axis 15 and the tilting movement along the tilt axis will be prevented. It is also preferable that the longitudinal lock mechanism 16 and the tilt lock mechanism 31 operate independently of one another. Specifically, it is preferred that the lock select mechanism 48 position the tilt lock mechanism 31 in its engaged position when the longitudinal lock mechanism 16 is in the unlocked position. Similarly, it is preferred that longitudinal lock mechanism 16 is in the locked position when the tilt lock mechanism 31 is in the disengaged position.

In order to control the longitudinal lock mechanism 16 and the tilt lock mechanism 31, the lock select mechanism 48 includes a select plate 50 further defining the rotation axis 26. The select plate 50 provides an interface between the lock select mechanism 48 and both of the longitudinal lock mechanism 16 and the tilt lock mechanism 31. The bolt 24 extends through the select plate 50 along the rotation axis 26 for allowing the select plate 50 to rotate about the rotation axis 26. As the select plate 50 rotates about the rotation axis 26 in a first operation, the lock select mechanism 48 positions the tilt lock mechanism 31 in the engaged position and the longitudinal lock mechanism 16 in the unlocked position. When the select plate 50 is rotated about the rotation axis 26 in a second operation, the lock select mechanism 48 positions the longitudinal lock mechanism 16 in the locked position and the tilt lock mechanism 31 in the disengaged position. During normal operation, the tilt lock mechanism 31 is in the engaged position and the longitudinal lock mechanism 16 is in the locked position to prevent tilting and longitudinal movement, respectively.

Figure 6B:
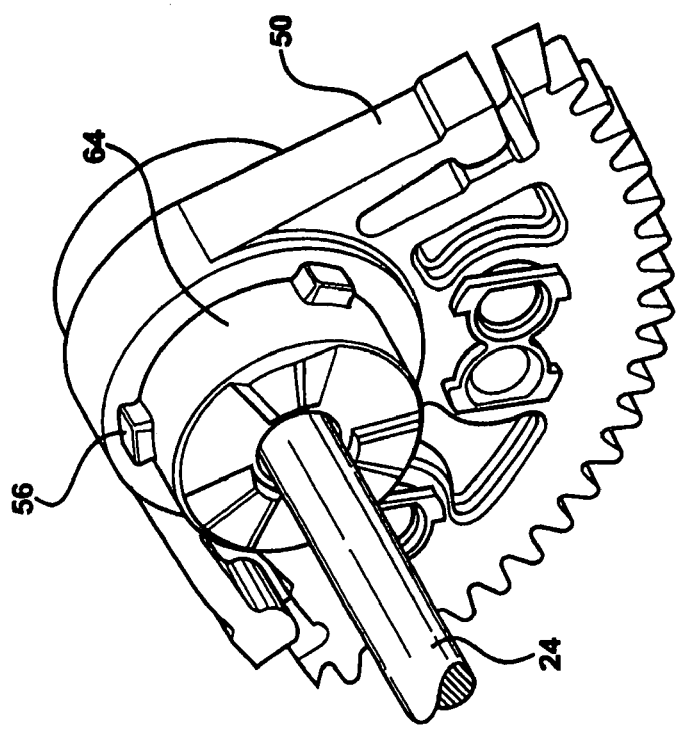
FIG. 6B is a perspective view of a select mechanism used with the tilt lock mechanism and the longitudinal lock mechanism.
Figure 6A:
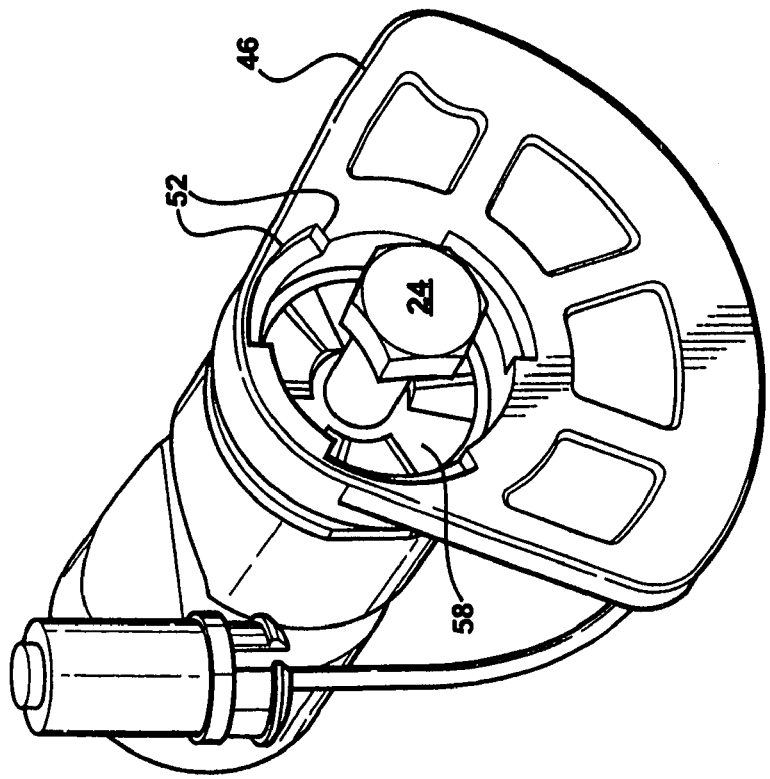
FIG. 6A is a perspective view of a tilt plate used with the tilt lock mechanism.

As best shown in FIGS. 5, 6A and 6B, the lock select mechanism 48 includes the tilt plate 46 coupled to the select plate 50 for coupling the lock select mechanism 48 to the tilt lock mechanism 31. During the first operation, the tilt plate 46 does not rotate, and cable 44 remains relaxed, and thus the lock select mechanism 48 maintains the tilt lock mechanism 31 in the engaged position. Selective rotation of the tilt plate 46 during the second operation causes the tilt plate to pull cable 44, and move arm 34 to the position shown in FIG. 4. The tilt plate 46 allows the lock select mechanism 48 to selectively rotate the tilt lock mechanism 31 during the second operation. Thus, the lock select mechanism 48 causes the tilt plate 46 to position the tilt lock mechanism 31 in the disengaged position.

The tilt plate 46 defines a groove 52 having an end and the select plate 50 includes a tab 56 slidably disposed in the groove 52. The tab 56 slides in the groove 52 during the first operation to maintain the tilt lock mechanism 31 in the engaged position to prevent tilting movement. The tab 56 abuts the end 54 of the groove 52 to move the tilt plate 46 during the second operation to position the tilt lock mechanism 31 in the disengaged position to permit tilting movement. Therefore, in the first operation, the select plate 50 rotates without pushing the tilt plate 46, resulting in the select plate 50 rotating about the rotation axis 26 independent of the tilt plate 46. Since the tilt plate 46 fails to rotate about the rotation axis 26 with the select plate 50 in the first operation, the cable 44 remains relaxed. As previously mentioned, when the cable 44 is relaxed, the tilt lock mechanism 31 is positioned in the engaged position for preventing the tilting movement of the tilt housing 30 to a different angular position about the tilt axis.

When rotated during the second operation, the tabs 56 of the select plate 50 engage the ends of grooves 52 and push the tilt plate 46, causing the tilt plate 46 to rotate about the rotation axis 26. As previously discussed, the tilt plate 46 is connected to the cable 44 such that as the tilt plate 46 rotates during the second operation the cable 44 becomes taut to position the tilt lock mechanism 31 in the disengaged position for permitting the tilting movement. Once the tilt plate 46 is returned to an orientation corresponding to the normal or the first operation, the cable 44 becomes relaxed, which allows the tilt lock mechanism 31 to return to its engaged position for preventing tilting movement of the tilt head 30 to a different angular position about the tilt axis.

Figure 7:
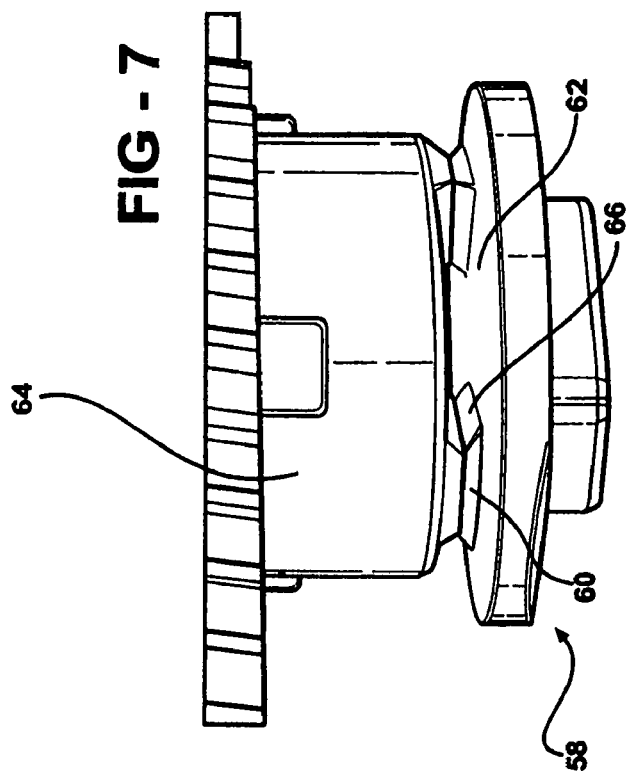
FIG. 7 is a side view of the select mechanism having a follower and the longitudinal lock mechanism having a cam.

Referring now to FIGS. 2 and 7, the lock select mechanism 48 further includes a cam 58 coupled to the select plate 50 for coupling the lock select mechanism 48 to the longitudinal lock mechanism 16. The cam 58 further defines the rotation axis 26, and the bolt 24 extends through the cam 58 along the rotation axis 26. As the select plate 50 rotates about the rotation axis 26, the cam 58 moves laterally along the rotation axis 26. The movement of the cam 58 along the rotation axis 26 pushes against the second wedge 20 to compress the interconnecting spring 22 between the second wedge 20 and first wedge 18 and to create the frictional force against the inner jacket 14 to prevent the longitudinal movement of the inner jacket 14 along the longitudinal axis 15 relative to the outer jacket 12. Likewise, the cam 58 moves laterally along the rotation axis 26 to decompress or expand the interconnecting spring 22 while remaining in constant contact with the second wedge 20. As the cam 58 decompresses the interconnecting spring 22, the first wedge 18 and the second wedge 20 fail to create the frictional force against the inner jacket 14, thus permitting longitudinal movement of the inner jacket 14 along the longitudinal axis 15 relative to the outer jacket 12.

The cam 58 includes an elevated portion 60 and a recessed portion 62. The select plate 50 includes a follower 64 disposed along the rotation axis 26. The follower 64 rotates about the rotation axis 26 with the select plate 50. As the select plate 50 rotates about the rotation axis 26, the follower 64 abuts either the elevated portion 60 or the recessed portion 62 of the cam 58. The follower 64 abuts the recessed portion 62 of the cam 58 during the first operation to position the longitudinal lock mechanism 16 in the unlocked position to permit longitudinal movement of the inner jacket 14. During the first operation, the follower 64 causes the cam 58 to move laterally along the rotation axis 26 to decompress the interconnecting spring 22, which permits the longitudinal movement of the inner jacket 14 along the longitudinal axis 15 relative to the outer jacket 12. The follower 64 abuts the elevated portion 60 of the cam 58 during the second operation to position the longitudinal lock mechanism 16 in the locked position to prevent longitudinal movement of the inner jacket 14. During the second operation, the cam 58 pushes the second wedge 20 to compress the spring and to prevent the longitudinal movement of the inner jacket 14 relative to the outer jacket 12. The cam 58 further includes a ramped portion 66 interconnecting the elevated portion 60 and the recessed portion 62. The ramped portion 66 extends between the recessed portion 62 and the elevated portion 60 for permitting the follower 64 to move between the recessed portion 62 and the elevated portion 60. In other words, during the first operation of the locket select mechanism 48 the follower 64 abuts the recessed portion 62 of the cam 58 when the tab 56 is sliding in the groove 52, thereby placing the longitudinal lock mechanism 16 in its unlocked position, while allowing the tilt lock mechanism 31 to remain in its engaged position, and during the second operation of the lock select mechanism 48 the follower 64 abuts the elevated portion 60 of the cam 58 when the tab 56 abuts the end of the groove 52 to move the tilt plate 46, thereby allowing the longitudinal lock mechanism 16 to remain in its locked position, while placing the tilt lock mechanism 31 in its disengaged position.

Referring now to FIGS. 1 and 5, the steering column assembly 10 includes a drive mechanism 68 operatively connected to the lock select mechanism 48. The drive mechanism 68 includes a motor 70 for moving the longitudinal lock mechanism 16 and the tilt lock mechanism 31 during the first operation and the second operation. The motor 70 may be an electric motor 70 or any other known to those in the art. The drive mechanism 68 drives the lock select mechanism 48 to move the longitudinal lock mechanism 16 between the locked position and the unlocked position and the tilt lock mechanism 31 between the engaged position and the disengaged position.

The drive mechanism 68 includes a driver 72 operatively connected to the lock select mechanism 48 for imparting motion onto the lock select mechanism 48. The motor 70 is operatively connected to the driver 72 for power operating the tilt lock mechanism 31 and the longitudinal lock mechanism 16. The motor 70 is connected to the driver 72 with a drive cable 74. As the motor 70 rotates, the drive cable 74 causes the driver 72 to rotate. In one embodiment, the select plate 50 includes a curved surface having a series of teeth. Driving the teeth causes the select plate 50 to rotate about the rotation axis 26. Those skilled in the art realize that the select plate 50 may have various shapes and sizes that are within the scope of the subject invention. In this embodiment, the driver 72 is further defined as a worm gear in meshing engagement with the teeth of the select plate 50. As the driver 72 rotates, the meshing engagement of the teeth of the select plate 50 with the rotating worm gear cause the select plate 50 to rotate about the rotation axis 26. Those skilled in the art realize that changing the direction of the rotation of the driver 72 subsequently changes the direction that the select plate 50 rotates about the rotation axis 26.

Accordingly, the driver 72 controls the lock select mechanism 48 to position the tilt lock mechanism 31 in the engaged position and the disengaged position, and the longitudinal lock mechanism 16 in the locked position and the unlocked position. Power operating the control of the lock select mechanism 48 permits ergonomic adjustments of the angular positioning of the tilt head 30 about the tilt axis and the longitudinal movement of the inner jacket 14 along the longitudinal axis 15 relative to the outer jacket 12.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A steering column assembly for a vehicle, said steering column assembly comprising:
    an outer jacket for attachment to the vehicle;
    an inner jacket coupled to said outer jacket and movable relative to said outer jacket along a longitudinal axis;
    a longitudinal lock mechanism operatively connected to said inner jacket and having a locked position for preventing longitudinal movement and an unlocked position for permitting longitudinal movement;
    a tilt housing for providing tilting movement to an angular position;
    a tilt lock mechanism operatively connected to said tilt housing and having an engaged position for preventing tilting movement and a disengaged position for permitting tilting movement;
    a lock select mechanism coupled to said tilt lock mechanism and said longitudinal lock mechanism, said lock select mechanism including a select plate defining a rotation axis, said select plate including a series of teeth; and
    a drive mechanism operatively connected to said lock select mechanism, said drive mechanism including a motor for moving said longitudinal locking mechanism and said tilt lock mechanism between said respective positions, and a driver operatively connected to said lock select mechanism for imparting motion onto said lock select mechanism, said driver defined as a worm gear in meshing engagement with said teeth of said select plate;
    wherein said lock select mechanism further includes a tilt plate coupled to said select plate for coupling said lock select mechanism to said tilt lock mechanism and a cam coupled to said select plate for coupling said lock select mechanism to said longitudinal lock mechanism and wherein rotation of said worm gear moves said longitudinal lock mechanism and said tilt lock mechanism between said respective positions.

2. A steering column assembly for a vehicle, said steering column assembly comprising:
an outer jacket for attachment to the vehicle;
an inner jacket coupled to said outer jacket and movable relative to said outer jacket along a longitudinal axis;
a longitudinal lock mechanism operatively connected to said inner jacket and having a locked position for preventing longitudinal movement and an unlocked position for permitting longitudinal movement;
a tilt housing for providing tilting movement to an angular position;
a tilt lock mechanism operatively connected to said tilt housing and having an engaged position for preventing tilting movement and a disengaged position for permitting tilting movement;
a lock select mechanism coupled to said tilt lock mechanism and said longitudinal lock mechanism, said lock select mechanism including a select plate defining a rotation axis; and
a drive mechanism operatively connected to said lock select mechanism with said drive mechanism including a motor for moving said longitudinal locking mechanism and said tilt lock mechanism between said respective positions, said drive mechanism including a driver operatively connected to said lock select mechanism for imparting motion onto said lock select mechanism;
wherein said lock select mechanism further includes a tilt plate coupled to said select plate for coupling said lock select mechanism to said tilt lock mechanism.

3. A steering column assembly as set forth in claim 2 wherein said tilt plate defines a groove having an end and wherein said select plate includes a tab slideably disposed in said groove for sliding in said groove during a first operation to position said tilt lock mechanism in said engaged position to prevent tilting movement and for abutting said end of said groove to move said tilt plate during a second operation to position said tilt lock mechanism in said disengaged position to permit tilting movement.

4. A steering column assembly as set forth in claim 2 wherein said lock select mechanism includes a cam having an elevated portion and a recessed portion and said select plate includes a follower abutting said recessed portion of said cam during a first operation to position said longitudinal lock mechanism in said unlocked position to permit longitudinal movement and said follower abuts said elevated portion of said cam during a second operation to position said longitudinal lock mechanism in said locked position to prevent longitudinal movement.

5. A steering column assembly as set forth in claim 2 wherein said tilt plate defines a groove having an end and said select plate includes a tab slideably disposed in said groove and wherein said lock select mechanism includes a cam having an elevated portion and a recessed portion and said select plate includes a follower abutting said recessed portion of said cam when said tab is sliding in said groove and said follower abuts said elevated portion of said cam when said tab abuts said end of said groove to move said tilt plate.

6. A lock select mechanism for a steering column assembly having a tilt lock mechanism moveable between an engaged position and a disengaged position and a longitudinal lock mechanism moveable between a locked position and an unlocked position, said lock select mechanism comprising:
a select plate having a follower and defining a rotation axis, said select plate follower being rotatable about said rotation axis with said select plate;
a cam having an elevated portion and a recessed portion, the longitudinal lock mechanism locked position being that in which said cam elevated portion is in abutting engagement with said follower, the longitudinal lock mechanism unlocked position being that in which said cam recessed portion is in abutting engagement with said follower; and
a tilt plate coupled to said select plate and being rotatable about said rotation axis, the tilt lock mechanism being moved into its disengaged position by rotation of said tilt plate with said select plate in a direction opposite that in which said select plate is rotated in moving said follower into abutting engagement with said cam recessed portion.

7. A lock select mechanism as set forth in claim 6, said select plate being rotatable independently of said tilt plate about said rotation axis, the tilt lock mechanism being in its engaged position simultaneously with the longitudinal lock mechanism being in its locked position as said follower engages said cam elevated portion.

8. A lock select mechanism as set forth in claim 6, wherein said tilt plate defines a groove having an end, and said select plate includes a tab slidably disposed in said groove, said tab being moved slidably along said groove during a first operation in which the tilt lock mechanism is maintained in its engaged position, said tab being in abutment with said end of said groove and said tilt plate being moved with said select plate during a second operation in which the tilt lock mechanism is moved into its disengaged position.

9. A lock select mechanism as set forth in claim 6, further comprising said follower being moved into abutment with said cam recessed portion during a first operation in which the longitudinal lock mechanism is moved into its unlocked position, and said follower being moved into abutment with said cam elevated portion during a second operation in which the longitudinal lock mechanism is moved into its locked position.

10. A lock select mechanism as set forth in claim 9, wherein said cam includes a ramped portion between said cam recessed portion and said cam elevated portion, said follower being moved along said cam ramped portion as said follower is being moved between abutment with said cam recessed portion and abutment with said cam elevated portion.

11. A lock select mechanism as set forth in claim 6, wherein said tilt plate defines a groove having an end, and said select plate includes a tab slidably disposed in said groove, said follower being in abutting engagement with said cam recessed portion while said tab is being moved within said groove, said follower being in abutting engagement with said cam elevated portion while said tab is in abutting contact with said end of said groove.

12. A lock select mechanism as set forth in claim 11, wherein said cam includes a ramped portion between said cam recessed portion and said cam elevated portion, said follower being moved along said cam ramped portion as said follower is being moved between abutting engagement with said cam recessed portion and abutting engagement with said cam elevated portion.

13. A lock select mechanism for a steering column assembly having a tilt lock mechanism moveable between an engaged position and a disengaged position and a longitudinal lock mechanism moveable between a locked position and an unlocked position, said lock select mechanism comprising:
a select plate having a follower and defining a rotation axis and rotatable about said rotation axis;

a cam having an elevated portion and a recessed portion abutting said follower of said select plate with said select plate rotating about said axis and said follower engaging said elevated portion to position the longitudinal lock mechanism in the locked position; and a tilt plate coupled to said select plate with said select plate rotating about said rotation axis with said tilt plate to position the tilt lock mechanism in the disengaged position and said follower engaging said elevated portion of said cam to simultaneously lock the longitudinal lock mechanism;

wherein said tilt plate defines a groove having an end and wherein said select plate includes a tab slideably disposed in said groove for sliding in said groove during a first operation to position the tilt lock mechanism in the engaged position to prevent tilting movement and for abutting said end of said groove to move said tilt plate during a second operation to position the tilt lock mechanism in the disengaged position to permit tilting movement.

14. A lock select mechanism for a steering column assembly having a tilt lock mechanism moveable between an engaged position and a disengaged position and a longitudinal lock mechanism moveable between a locked position and an unlocked position, said lock select mechanism comprising:

a select plate having a follower and defining a rotation axis and rotatable about said rotation axis;

a cam having an elevated portion and a recessed portion abutting said follower of said select plate with said select plate rotating about said axis and said follower engaging said elevated portion to position the longitudinal lock mechanism in the locked position; and a tilt plate coupled to said select plate with said select plate rotating about said rotation axis with said tilt plate to position the tilt lock mechanism in the disengaged position and said follower engaging said elevated portion of said cam to simultaneously lock the longitudinal lock mechanism;

wherein said tilt plate defines a groove having an end and said select plate includes a tab slideably disposed in said groove and wherein said cam includes an elevated portion and a recessed portion and said follower abuts said recessed portion of said cam when said tab is sliding in said groove and said follower abuts said elevated portion of said cam when said tab abuts said end of said groove to move said tilt plate.

15. A lock select mechanism as set forth in claim 14 wherein said cam further includes a ramped portion between said recessed portion and said elevated portion for permitting said follower to move between said recessed portion and said elevated portion.

16. A steering column assembly for a vehicle, said steering column assembly including:

an outer jacket, attachment of said steering column assembly to the vehicle being through said outer jacket;

an inner jacket coupled to said outer jacket, said inner jacket and said outer jacket having relative movement along a longitudinal axis;

a longitudinal lock mechanism operatively connected to said inner jacket and having a locked position in which said relative longitudinal movement between said inner jacket and said outer jacket is prevented, and an unlocked position in which said relative longitudinal movement between said inner jacket and said outer jacket is permitted;

a tilt housing connected to said inner jacket, said tilt housing and said inner jacket having relative tilting movement between different angular positions;

a tilt lock mechanism operatively connected to said tilt housing and having an engaged position in which said relative tilting movement between said tilt head and said inner jacket is prevented, and a disengaged position in which said relative tilting movement between said tilt head and said inner jacket is permitted; and a lock select mechanism coupled to said tilt lock mechanism and said longitudinal lock mechanism, said lock select mechanism comprising:

a select plate including a follower and defining a rotation axis, said select plate follower being rotatable about said rotation axis with said select plate;

a cam including an elevated portion and a recessed portion, the longitudinal lock mechanism locked position being that in which said cam elevated portion is in abutting engagement with said follower, the longitudinal lock mechanism unlocked position being that in which said cam recessed portion is in abutting engagement with said follower; and a tilt plate coupled to said select plate and being rotatable about said rotation axis, said tilt lock mechanism being moved into its disengaged position by rotation of said tilt plate with said select plate in a direction opposite that in which said select plate is rotated in moving said follower into abutting engagement with said cam recessed portion.

17. A steering column assembly as set forth in claim 16, further comprising a drive mechanism operatively connected to said lock select mechanism, said drive mechanism including a rotating motor, said longitudinal lock mechanism and said tilt lock mechanism being moved between their said respective positions through rotation of said motor.

18. A steering column assembly as set forth in claim 17, wherein said drive mechanism includes a driver operatively connected to said lock select mechanism, motion being imparted onto said lock select mechanism by said driver.

19. A steering column assembly as set forth in claim 17, wherein said motor is reversible, said longitudinal lock mechanism being moved into its unlocked position and said tilt lock mechanism being moved into its disengaged position by said lock select mechanism being respectively moved in opposite directions by said motor being respectively operated in rotationally opposite directions.

20. A steering column assembly as set forth in claim 16, wherein said tilt plate defines a groove having an end, and said select plate includes a tab slidably disposed in said groove, said tab being moved slidably along said groove during a first operation in which said tilt lock mechanism is maintained in said engaged position, said tab being in abutment with said end of said groove and said tilt plate being moved with said select plate during a second operation in which said tilt lock mechanism is moved into said disengaged position.

21. A steering column assembly as set forth in claim 16, wherein said cam includes a ramped portion between said cam recessed portion and said cam elevated portion, said follower being moved along said cam ramped portion as said follower is being moved between abutting engagement with said cam recessed portion and abutting engagement with said cam elevated portion.

* * * * *